G. KOLSKY.
PROCESS OF TREATING WOOL SCOURING LIQUORS AND THE LIKE.
APPLICATION FILED DEC. 24, 1915.
1,325,873.   Patented Dec. 23, 1919.
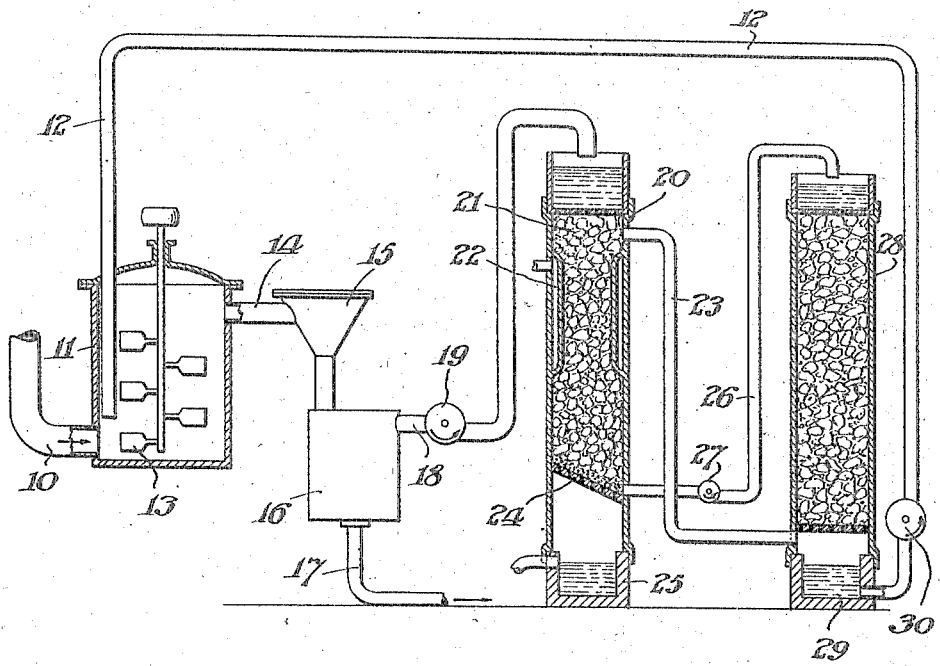
Inventor:
George Kolsky,
By John R. Nolan
Attorney.

UNITED STATES PATENT OFFICE.

GEORGE KOLSKY, OF NEW YORK, N. Y., ASSIGNOR TO THE DIAMOND MATCH COMPANY, OF CHICAGO, ILLINOIS, A CORPORATION OF ILLINOIS.

PROCESS OF TREATING WOOL-SCOURING LIQUORS AND THE LIKE.

1,325,873.          Specification of Letters Patent.       Patented Dec. 23, 1919.

Application filed December 24, 1915. Serial No. 68,539.

*To all whom it may concern:*

Be it known that I, GEORGE KOLSKY, a citizen of the Republic of Switzerland, and resident of the city and county of New York and State of New York, have invented certain new and useful Improvements in Processes of Treating Wool-Scouring Liquors and the like, of which the following is a specification.

This invention relates to a process of treating aqueous liquors containing greasy, fatty or oily materials; having reference, more particularly, to the treatment of liquors which have been used in the scouring of sheep's wool.

The primary object of my invention is the recovery or utilization in an economical and efficient manner of valuable products (grease, potash, etc.,) from wool-scouring liquors, especially, though not exclusively, from such liquors which have been employed in a single scouring operation, as distinguished from operations which involve successive washings of the wool. When the potash and the grease are removed from the wool in a single-wash operation, the resulting liquor is of so great a volume, and consequently dilution, that it is unprofitable to employ evaporation treatment for the recovery of potash, and on account of the prohibitive cost it is also impracticable to separate the grease by the action of acids, or other chemicals, which have heretofore been suggested for that purpose.

Another object of my invention is the deodorizing and decolorizing of the liquor (which has an offensive odor and an unpleasant appearance), and hence the waste liquor, after treatment, may be discharged into natural streams without danger of polluting them. Other important objects and advantages of my invention will be hereinafter pointed out.

The leading feature of my invention resides in the treatment of wool-scouring or analogous liquor with an agent which efficiently coagulates the emulsified grease (or the like) content in such a manner that the latter can be readily separated from the liquor, and which agent is recoverable for repeated use in a cyclic process thus materially reducing the cost of the procedure. More specifically stated such agent comprises a compound of a precipitating metal oxid and an acid, which compound is decomposable by hydrolysis when heated in the presence of water.

The invention comprehends various other features and modes of procedure which need not be preliminarily mentioned as they will be hereinafter fully described and the scope of the invention then be defined in the appended claims.

For the purpose of exemplifying my invention, I have illustrated in the annexed drawing a form of apparatus which can be used in carrying out the process in an economical and efficient manner.

This drawing is a diagram of the main portion of the apparatus, certain parts being shown in elevation and others in section.

The wool-scouring liquor (*i. e.* liquor which has been used for scouring wool) or other liquor to be treated, is supplied through a conduit 10 to a tank 11 which also receives through a pipe 12, a "cutting" agent comprising, preferably, a solution of aluminum sulfite, $Al_2(SO_3)_3$. The tank is preferably equipped with an agitator 13 for the purpose of hastening the action by thoroughly mixing the two liquids. The aluminum sulfite (or other agent having the general characteristics hereinafter mentioned) acts on the wool-scouring liquor in such a way as to cause an easy subsequent separation of the grease or like emulsified material from the remaining liquid. As a mater of fact, if the mixture were allowed to stand undisturbed after the treatment with the cutting agent, the grease would rise to the surface of the liquid; but such procedure would require a relatively long period of time. For commercial reasons, therefore, I prefer to hasten the operation. Accordingly the mixture of liquid and emulsified substance is caused to pass through an overflow pipe 14 into a funnel 15, and thence to a suitable separator 16, which may be, for instance, of the centrifugal type. The grease or other emulsified substance passes from the separator through a discharge pipe 17 to a storage receptacle (not shown), or to suitable apparatus for further treatment. The non-greasy liquid passing out from the separator through a suitably-located pipe 18, consists of a solution of aluminum sulfite (more dilute than that supplied through the pipe 12) and containing other compounds, principally potassium compounds. This liquid is delivered through the pipe 18, by means of an appropriate pump 19, to a tower 20, wherein such liquid is discharged in a series of fine streams through the customary filling of stone 21, or the like, and as the liquid streams or trickles down it is heated by means of a steam jacket 22, or in any other suitable manner. The temperature of the heat is such that the aluminum sulfite is decomposed into sulfur dioxid gas and aluminum hydroxid, while the potassium salt remains in solution.

The liberated sulfur dioxid passes from the tower 20 through a pipe 23, while the aluminum hydroxid is collected near the bottom of the tower on a suitable filter and grating 24, and the solution of potassium salts is received in an underlying pan or tank 25. This solution of potassium salts is at first too dilute to be treated economically by evaporation for the recovery of the potassium salts; and consequently I use the liquor collected in the tank 25, as a wash liquor for scouring the wool, and do this repeatedly until, through the successive washing operations, the liquid collected in the tank 25 is of such concentration as to be suitable for the usual evaporation treatment. Inasmuch as some sulfur dioxid remains in the solution of potassium salts, and as it is desirable to remove the former in order to avoid its detrimental action on pipes and other parts of the apparatus, I prefer to subject the solution, before it is used for a succeeding scouring operation, to a treatment which consists in passing air or carbon dioxid therethrough, in the presence of lime or limestone.

The reaction taking place in the decomposition tower 20 may be represented by the following equation:

(1) $Al_2(SO_3)_3 + 4H_2O = 2Al(OH)_3 + H_2O + 3SO_2$.

The aluminum hydroxid collected on the filter and grating at the bottom of the tower 20 is withdrawn through a pipe 26, by the action of a pump 27 and delivered to the top of a combining tower 28, which may be of a construction similar to that of the tower 20, except that the heater and the filter are omitted. The sulfur dioxid gas is delivered through the pipe 23 to the lower portion of the combining tower 28, and travels therein in the opposite direction to the aluminum hydroxid, the latter being suspended in a sufficient amount of water or solution to enable it to be fed by the pump 27. The reaction in the tower 28 takes place at ordinary temperature, for which purpose the pipes 23 and 26 may be air cooled or other cooling means (not shown) may be provided if desired. This reaction is represented by the equation:

(a) $2Al(OH)_3 + H_2O + 3SO_2 = Al_2(SO_3)_3 + 4H_2O$.

The aluminum sulfite thus reconstituted is collected in a tank 29 at the bottom of the tower 28, from which tank a circulating pump 30 returns it to the tank 11 through the pipe 12. Barring slight losses, incident to leakage, partial neutralization, &c., the process hereinbefore described requires no renewal of the original supply of cutting agent, and the economy of the process in this respect will be manifest.

If the recovery of the potassium salts (and other salts) contained in the liquid which is collected in the tank 25 be not desired, such liquid may be treated as waste and discharged into a river or other body of water, in which case the process would effect chiefly the recovery of the grease and the rendering of the waste liquid colorless and odorless.

The aluminum sulfite employed by me as a cutting agent as hereinbefore described, may be obtained in any suitable manner, for instance, by treating aluminum hydroxid with sulfur dioxid gas.

My invention in its broad aspect contemplates the employment of zinc or iron sulfite as a cutting agent, or, in general any derivative of sulfurous acid ($H_2SO_3$), the $SO_2$ of which is in unstable chemical combination, so as to be decomposable by hydrolysis when heated in the presence of water. Or, in other words, I may employ as a cutting agent any salt which when heated in the presence of water will evolve $SO_2$ and an insoluble compound, which latter, when treated with $SO_2$ at a lower temperature will again form the said salt.

Among the advantages of my improved process, I desire to emphasize the following:

First: The cost of the chemicals required for the treatment is reduced to a minimum, particularly in that the cutting agent is used over and over again.

Second: The successive use of the same potassium salt solution (after the removal of the grease and preferably after expelling any remaining $SO_2$) for washing wool; so as to increase the concentration with respect to potassium salts and thus render the subsequent evaporation more economical.

Third: The removal of grease or other emulsified matter so completely that the remaining liquid shows no trace of fat.

Fourth: The obtaining of wool-grease in a state of purity.

Fifth: The thorough deodorizing and decolorizing of the wool-scouring liquor, so that it may be safely discharged into streams without danger of polluting them.

I may add that the process which I have hereinbefore particularly described to exemplify my invention, may be modified in various particulars without departing from the principle of the invention.

What I claim is—

1. A process of treating the liquor resulting from the operation of wool scouring which comprises coagulating the grease therein by subjecting the said liquor to the action of a soluble derivative of sulfurous acid, the $SO_2$ of which is in unstable chemical combination, which salt is decomposable by hydrolysis when heated in the presence of water, into materials which will readily separate from the liquor, separating the grease from the aqueous liquor, decomposing the said derivative of sulfurous acid into materials which readily separate from the aqueous liquor, and bringing such materials together apart from at least the major portion of said liquor, under conditions capable of effecting the regeneration of the said derivative of sulfurous acid.

2. A process of treating the aqueous liquor resulting from the operation of wool scouring which comprises coagulating the grease therein by adding to such liquor, a solution of a derivative of sulfurous acid which is coagulative of grease, the sulfurous anhydrid of which derivative is in unstable chemical combination with the base thereof, so that the same is decomposable by hydrolysis when heated in the presence of water, separating the grease from the aqueous liquor, and thereafter heating the liquid sufficiently to decompose the sulfurous acid derivative.

3. A process of treating the liquor resulting from the operation of wool scouring, which comprises coagulating the grease therein by adding to said liquor a solution of a salt which is coagulative of the grease in the liquor, and which salt when heated in the presence of water evolves sulfur dioxid and produces a precipitation of an insoluble compound which latter when treated at a lower temperature with sulfur dioxid in the presence of water is capable of again forming the said salt, thereafter separating the coagulated grease from the remaining liquid, and regenerating the treating salt.

4. A process of treating aqueous liquor containing emulsified grease, which process comprises subjecting the liquor to the action of the sulfite of an insoluble compound which is coagulative of grease in the liquor and which sulfite can be revivified, separating the grease from the remaining liquid; treating the said liquid to recover and revivify the said compound, and using the latter for the treatment of further quantities of aqueous liquor containing emulsified grease.

5. A process of treating the liquor resulting from a wool-scouring operation which comprises the coagulating of grease therein by subjecting the said liquor to treatment with a solution of aluminum sulfite, thereafter separating the emulsified grease from the remaining liquid, heating the remaining liquid sufficiently to decompose the aluminum sulfite into a basic aluminum compound and sulfur dioxid, and bringing together the said aluminum compound and sulfur dioxid so produced, at a lower temperature to regenerate the aluminum sulfite.

6. A process of treating the aqueous liquor, resulting from the operation of wool scouring, which comprises coagulating the grease therein by the action of aluminum sulfite; separating the coagulated grease from the remaining liquid; heating the said liquid at a temperature sufficient to evolve sulfur dioxid and to precipitate a basic aluminum compound; separating the soluble residuum; bringing said sulfur dioxid into contact with said aluminum-containing precipitate at a lower temperature to reconstitute the said aluminum sulfite; and using the latter solution for the treatment of further quantities of the liquor resulting from wool scouring.

7. A process of treating the liquor resulting from the operation of wool-scouring, which process comprises coagulating the grease by subjecting the liquor to the action of a solution of aluminum sulfite; separating the coagulated grease from the remaining liquid; heating the said liquid at a temperature sufficient to evolve sulfur dioxid and to precipitate aluminum in the form of a basic compound; separating a substantial portion of the soluble residuum containing potassium salts and using it as a wash liquor in subsequent operations until a predetermined concentration has been attained; bringing said sulfur dioxid into active contact with said precipitated aluminum compound at a lower temperature to reconstitute said aluminum sulfite solution, and using the latter solution for the treatment of further quantities of wool-scouring liquor.

8. A process of treating liquids containing soapy and fatty materials which comprises adding thereto a grease-precipitating agent, separating the grease, thereafter decomposing at least a major part of the said agent, separating the reaction products of such decomposition from the bulk of the liquid, and reuniting the same to regenerate said agent.

9. In the separation of grease from wool washings, the steps of adding thereto a solution containing aluminum sulfite, decomposing said sulfite and subsequently regenerating aluminum sulfite from the products of such decomposition.

10. In the separation of grease from liquors containing emulsified grease, of the general character of wool-washings, the step of adding thereto an agent capable of coagulating the grease, such agent comprising a substantially neutral sulfite which is readily decomposable into $SO_2$ and a precipitate, by a heating operation.

11. In the separation of grease from wool-washings, the step of treating such washings with sulfur-dioxid-containing agent capable of coagulating grease, separating such coagulated grease, heating the remaining liquor to a temperature sufficiently high to decompose the precipitating agent, separating the products of such decomposition from at least the bulk of the liquor, regenerating the precipitating agent, and treating a further amount of the washings with such regenerated precipitating agent.

12. A process of treating the liquor resulting from the operation of wool scouring which comprises coagulating the grease therein by subjecting the said liquor to the action of a soluble salt capable of giving upon heating with water, an insoluble metal-containing compound, and a gaseous acid-forming-element-containing substance, separating the grease from the aqueous liquid, decomposing the salt into such metal compound and gaseous substance which readily separate from the aqueous liquid, and bringing such materials together, apart from at least a large portion of the said liquor, under conditions capable of producing the regeneration of the soluble salt used in the first step.

Signed at New York, in the county and State of New York, this 23d day of December, A. D. 1915.

GEORGE KOLSKY.